United States Patent [19]

Fujita et al.

[11] Patent Number: 5,109,407
[45] Date of Patent: Apr. 28, 1992

[54] COMMUNICATION DEVICE CONNECTED TO TELEPHONE LINE TOGETHER WITH TELEPHONE SET

[75] Inventors: Tsutomu Fujita; Yoshinobu Ido; Tsuneyoshi Yamada, all of Gifu, Japan

[73] Assignee: Sanyo Electric Co., Ltd., Osaka, Japan

[21] Appl. No.: 452,842

[22] Filed: Dec. 19, 1989

[30] Foreign Application Priority Data

Dec. 22, 1988 [JP] Japan .................. 63-324614
Jan. 20, 1989 [JP] Japan .................. 1-12706

[51] Int. Cl.⁵ .......................... H04M 11/00
[52] U.S. Cl. ......................... 379/105; 379/53
[58] Field of Search ........... 379/53, 54, 105, 77, 379/100, 98, 102, 104

[56] References Cited

U.S. PATENT DOCUMENTS

| | | | |
|---|---|---|---|
| 4,477,697 | 10/1984 | Judd et al. | 379/252 |
| 4,596,900 | 6/1986 | Jackson | 379/105 |
| 4,797,909 | 1/1989 | Mastromoro et al. | 379/77 |
| 4,813,070 | 3/1989 | Humphreys et al. | 379/212 |
| 4,821,312 | 4/1989 | Horton et al. | 379/77 |
| 4,845,636 | 7/1989 | Walker | 379/53 |
| 4,903,289 | 2/1990 | Hashimoto | 379/77 |
| 4,920,559 | 4/1990 | Hashimoto | 379/77 |
| 4,924,496 | 5/1990 | Figa et al. | 379/355 |
| 4,974,253 | 11/1990 | Hashimoto | 379/100 |

FOREIGN PATENT DOCUMENTS 204162  10/1985  Japan .

Primary Examiner—James L. Dwyer
Assistant Examiner—Ahmad F. Matar
Attorney, Agent, or Firm—Darby & Darby

[57] ABSTRACT

A communication device such as a video telephone is connected to a telephone line together with a telephone set at both parties. In response to an operation for removing a handset from a hook of the telephone set at this party, the video telephone at this party is initiated. Each of the video telephones includes a mode selecting switch and DTMF receiver which receives a DTMF signal from one of the telephone sets and decodes a received DTMF signal to output data representative of the mode of the video telephone. When a flag "1" is set, a mode of the video telephone at this party can be controlled in response to the DTMF signal which is received by the DTMF receiver from the telephone set at this party and, when a flat "2" is set a mode of the video telephone at this party can be controlled in response to the DTMF signal which is received by the DTMF receiver from the telephone set at the other party.

7 Claims, 7 Drawing Sheets

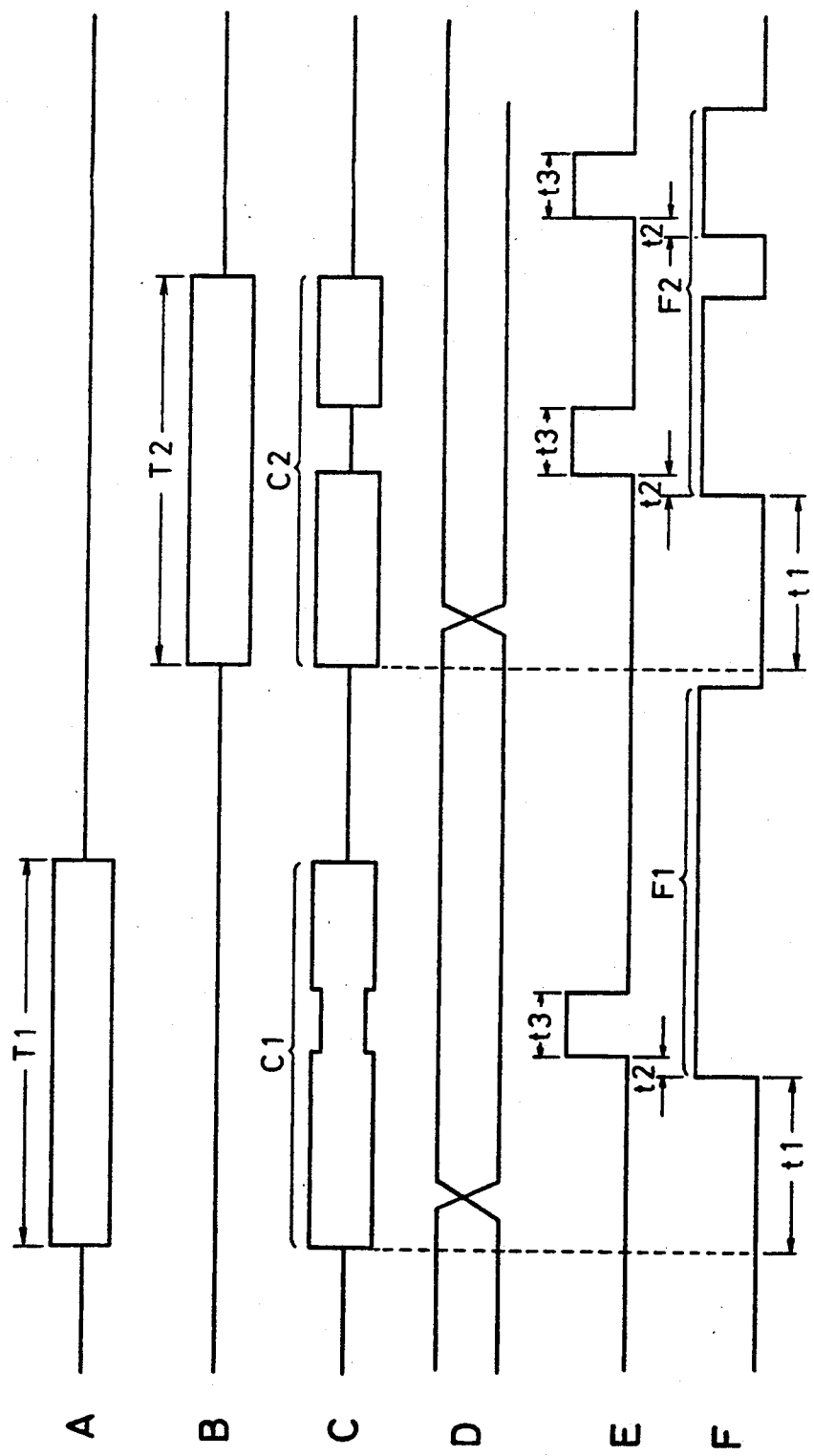

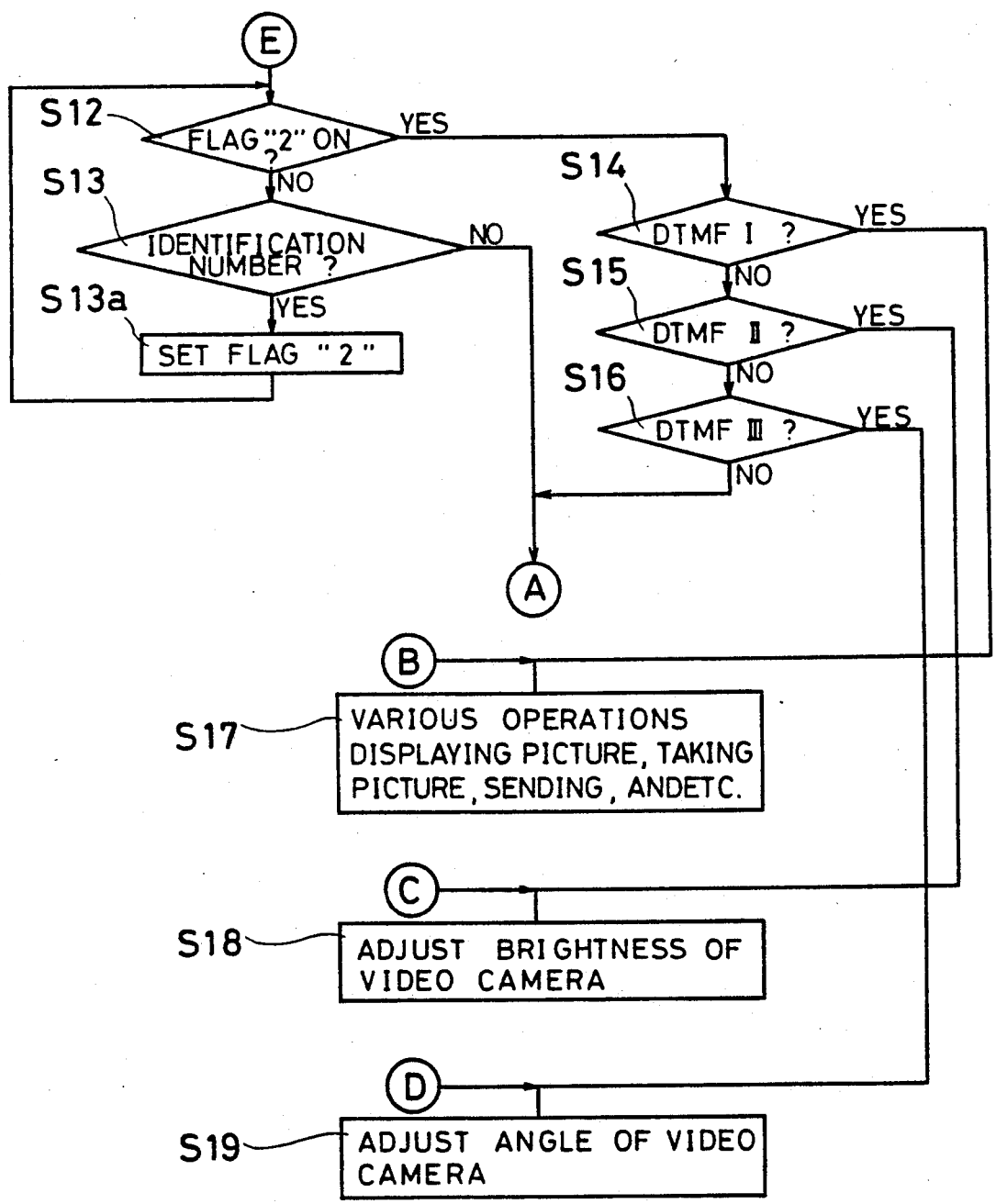

COMMUNICATION DEVICE CONNECTED TO TELEPHONE LINE TOGETHER WITH TELEPHONE SET

BACKGROUND OF THE INVENTION

1. Field of the Invention

The present invention relates to a communication device connected to a telephone line together with a telephone set. More specifically, the present invention relates to a communication device such as a video telephone whose operation mode can be controlled in response to a control signal supplied from a telephone set.

2. Description of the Prior Art

One example of a conventionally known communication device to be controlled in response to a control signal outputted from a telephone set is disclosed in, for example, Japanese Patent Application Laid-open No. 204162/1985. In this prior art, a communication device such as a facsimile is connected to a telephone line together with a telephone set and the facsimile is controlled in response to a control signal supplied from the telephone set. More specifically, the facsimile is driven when the specified number is entered from the telephone set after being connected to the telephone line, thereby to control a receiving or transmitting operation of the facsimile.

In the above described prior art, the facsimile does not have a function for determining whether a control signal being transmitted onto the telephone line is transmitted in an upward direction of the telephone line or in a downward direction of the telephone line. Accordingly, in a case where the facsimile is controlled under the leadership of a calling subscriber's telephone set, when a called subscriber erroneously transmits a control signal, the facsimile is liable to be erroneously operated in response to the erroneous operation of the called subscriber's telephone set. In addition, in order to remotely control such a communication device, the telephone line must be necessarily connected thereto.

SUMMARY OF THE INVENTION

Therefore, a principal object of the present invention is to provide a novel communication device connected to a telephone line together with a telephone set.

Another object of the present invention is to provide a communication device capable of being prevented from being erroneously operated in response to an erroneous operation of a called subscriber's telephone set.

Another object of the present invention is to provide a communication device capable of being remotely controlled by a telephone set even if a telephone set is not connected to a telephone line.

The other object of the present invention is to provide a communication device capable of being easily operated.

A communication device connected to a telephone line together with a telephone set in accordance with a present invention comprises: switch means for selectively designating an operation mode; identifying means for distinguishably identifying a request for communication which is outputted from a first telephone set arranged integrally with or adjacent to the communication device or a request for communication which is outputted from a second telephone set arranged at a remote point and relayed through the telephone line to be connected to the communication device; and control means for controlling the switch means in response to a result of the identification by the identifying means.

The control means includes allowing means for allowing the first telephone set to control the switch means in response to a request for communication from the first telephone set. The control means is further provided with a further allowing means for allowing the second telephone set to control the switch means in response to a request for communication from the second telephone set.

In an embodiment in accordance with the present invention, the communication device is provided with a further switch which is so constructed as to be set in an active state in response to an operation for starting communication by the first telephone set, for example, a removal of a handset from a hook button. Therefore, the communication device is initiated in response to such an operation.

Furthermore, the communication device is so constructed as to allow the first telephone set to remotely control an operation mode of the communication device even in a state where the first telephone set is not connected to the second telephone set through the telephone line.

A communication device in accordance with the present invention has a function for identifying a direction of transmitting a control signal being transmitted onto the telephone line and an operation mode of the communication device can be controlled on the basis of a result of such identification. In a case where an operation mode of the communication device is controlled under the leadership of a calling subscriber's telephone set, even if a called subscriber performs an erroneous operation, the communication device can be prevented from being erroneously operated in response to such an erroneous operation of the called subscriber's telephone set.

In addition, in accordance with the present invention, when the first telephone set is not connected to the telephone line, the first telephone set can be utilized as a remote control means of the communication device, and therefore, the communication device can be easily operated. Therefore, in a case where the communication device is a video telephone, it becomes possible to store in advance a still picture to be sent to the other party in a memory before the first telephone set is connected to the second telephone set through the telephone line and to send the still picture after the first telephone set is connected to the second telephone set, and therefore, an efficient communication can be expected.

The objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 3 is a timing chart showing an operation of identification of a request for communication.

FIGS. 4A and 4B are flowcharts showing an operation of a video telephone.

DETAIL DESCRIPTION OF THE PREFERRED EMBODIMENTS

Although an embodiment of the present invention will be described in detail as a video telephone system, it will be understood that the present invention is applicable other communication device such as a facsimile or the like.

Figure 1:
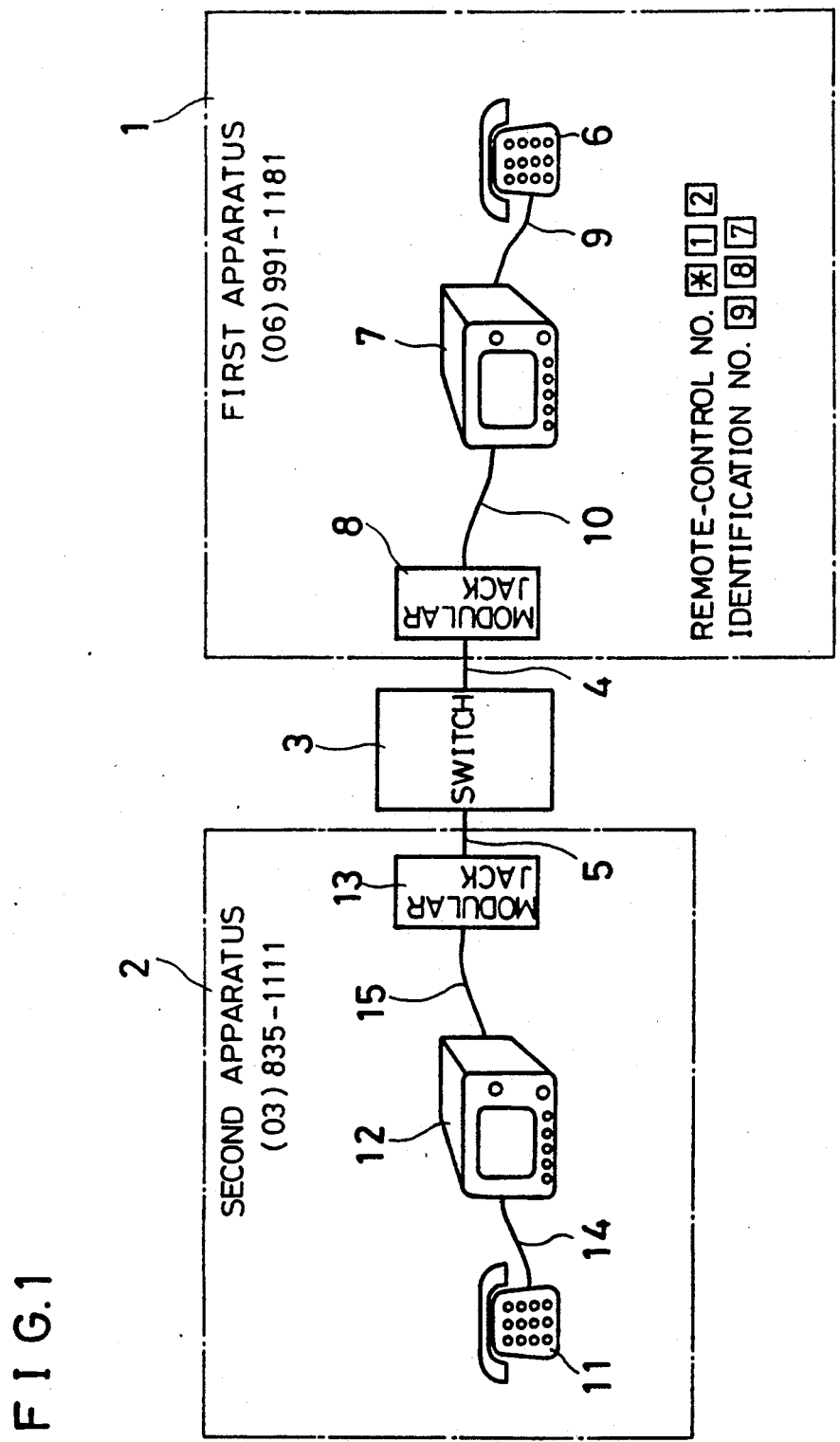
FIG. 1 is a block diagram schematically showing a communication system of an embodiment in accordance with the present invention.

With reference to FIG. 1, a first and second apparatuses 1 and 2 have substantially the same components and are so adapted as to be connected to each other through a switch 3 such as a local switch or an intra-office switch and telephone lines 4 and 5. The first and second apparatuses 1 and 2 are adapted such that either one thereof becomes a calling subscriber's apparatus and the other becomes a called subscriber's apparatus to permit a communication therebetween.

The first apparatus 1 includes a first telephone set 6, a first video telephone 7, a first modular jack 8 and telephone lines 9 and 10 for connecting them. Similarly, the second apparatus 2 includes a second telephone set 11, a second video telephone 12, a second modular jack 13 and telephone lines 14 and 15 for connecting them.

In the following description, it is assumed that each of the telephone sets 6 and 11 is of a push-button type in which different DTMF (Dual-Tone Multi-Frequency) signals are assigned to twelve buttons including ten buttons designated by numerals "0" to "9" and two buttons designated by signs "*" and "#". In addition, it is assumed that the telephone number of the first telephone set 6 is "(06)991-1181", the telephone number of the second telephone set 11 is "(03)835-1111", and a remote-control number and an identification number (respectively described later) of the first video telephone 7 are respectively "* 1 2" and "9 8 7".

Figure 2:
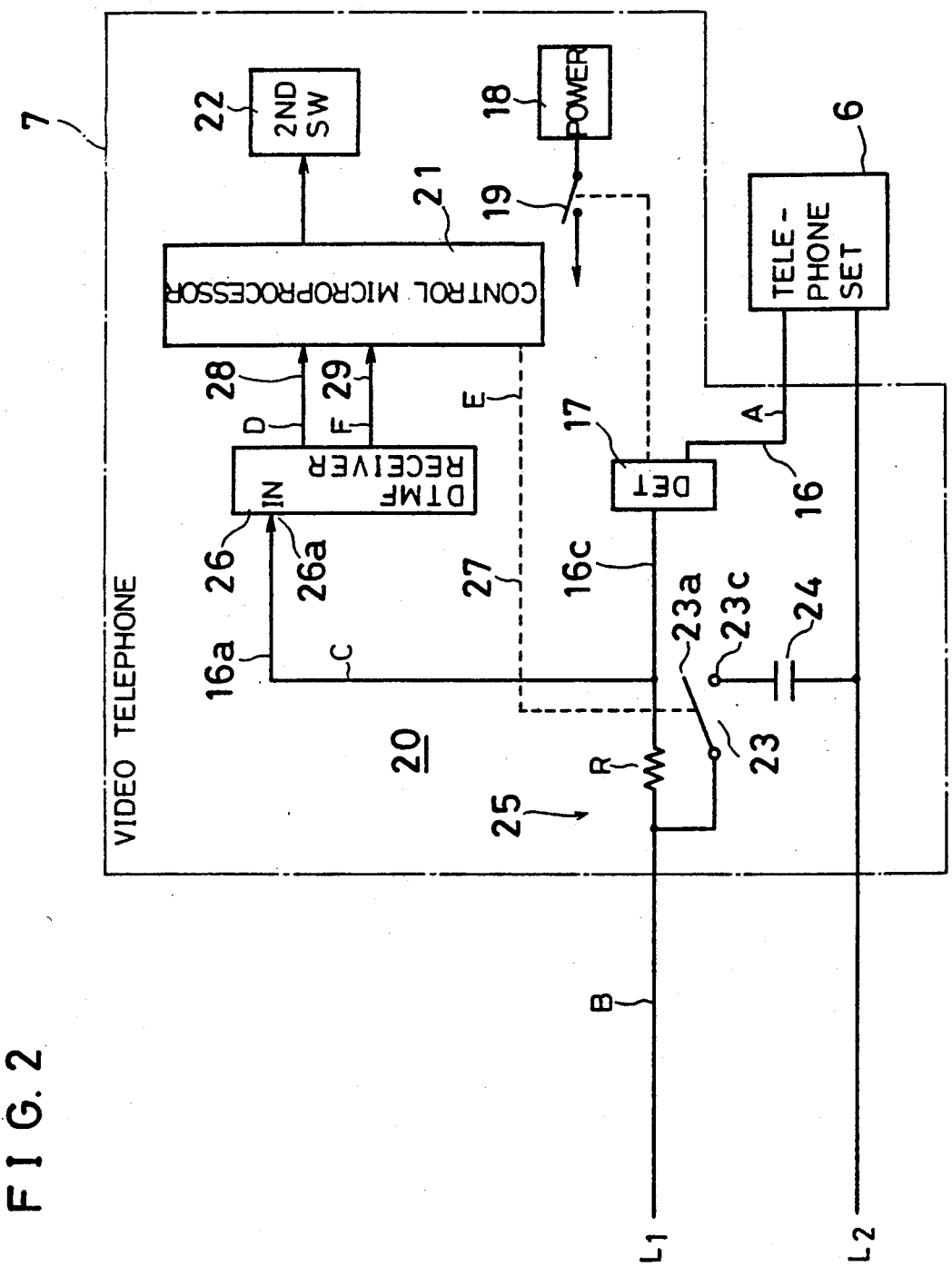
FIG. 2 is a block diagram showing a schematic configuration of a front end portion of a video telephone in accordance with the embodiment.

FIG. 2 is a block diagram mainly showing a schematic configuration of a front end portion of the first video telephone 7 in the first apparatus 1. This configuration is substantially the same as that of the second video telephone 12. Therefore, the first and second video telephones are merely referred to as a video telephone 7 except for a case where they must be particularly distinguished from each other.

In addition, the video telephone 7 generally includes a television camera, display means such as a CRT, a memory having a capacitance capable of storing several still pictures, and signal switching means for switching signals between the television camera, the display means and the memory and a telephone set; however, in order to simplify the drawing figures, all such components are not illustrated.

The video telephone 7 includes a line current detector 17 for detecting the presence or absence of a line current flowing on a telephone line 16. The video telephone 7 is constructed such that the line current detector 17 closes a first switch 19 which controls the connection or disconnection of the power supply 18 such as a commercial power supply or a self-contained power supply to a driving portion (not shown) of the video telephone 7 when the detector 17 detects the line current. Therefore, the video telephone 7 in accordance with this embodiment shown is set in an active state by an operation for removing a handset of the first telephone set 6 from a hook button for a message (off hook operation) or substantially the same operation as this operation, for example, an operation for initiating a message from an outside line in a case where the first telephone set 6 has a so-called automatic incoming function, and the active state is reset by an operation for completing such a message.

Alternatively, the video telephone 7 may be adapted such that a user can manually control the first switch 19 to turn on or off the power supply 18.

The video telephone 7 includes a communication request identifying portion 20 which determines whether a DTMF signal on the telephone line 16 is transmitted from the side of the first telephone set 6, that is, in a downward-direction or the telephone set 11, that is, in an upward-direction to identify the same. The video telephone 7 is further provided with a control portion 21 including a control microprocessor which is controlled on the basis of a result of the identification by the identifying portion 20, and a second switch 22 for designating an operation mode of the video telephone 7, for example, "sending picture", "taking picture" and "displaying picture" in accordance with a control signal from the control portion 21.

The communication request identifying portion 20 includes a muting circuit 25 having a switch 23, a capacitor 24 and a resistor R, and a DTMF receiver 26 which receives a DTMF signal on a telephone line 16a as its input. The control microprocessor 21 outputs a switch signal onto a switch control line 27 to control the above described switch 23. A movable contact 23a of the switch 23 is normally opened; however, the movable contact 23a is connected to a stationary contact 23c connected to a common telephone line L2 through the capacitor 24 when the switch control line 27 is in an active state.

The DTMF receiver 26 has its input terminal 26a connected to the telephone line 16a and is adapted to directly receive the DTMF signal from the first telephone set 6 and the second telephone set 11. The DTMF receiver 26 receives the DTMF signals to output data being dependent on the content of the DTMF signal, that is, determination as to which buttons are depressed to a 4-bit data line 28, and outputs a communication request identification signal F to a line 29. The control portion 21 generates the switch control signal E on the basis of the communication request identification signal F to control the switch 23 in the muting circuit 25 so as to connect the movable contact 23a to the stationary contact 23c in a time period during when the switch control signal E is active.

In FIG. 3 which is a timing chart for explaining an operation of the communication request identifying portion, "A" indicates a DTMF signal outputted at a time of operating the push-button of the first telephone set 6. The DTMF signal A is usually outputted over 60 milliseconds or more because it is outputted while the push-button is being depressed. A time period T1 indicates a time period during when the DTMF signal A is generated. "B" indicates a DTMF signal outputted at a time of operating the push-button of the second telephone set 11. The DTMF signal B is also outputted over 60 milliseconds or more. A time period T2 indicates a time period during when the DTMF signal B is generated.

A DTMF signal C is inputted to an input terminal 26a of the DTMF receiver 26, a DTMF signal C1 and a DTMF signal C2 being respectively inputted thereto in the time periods T1 and T2. More specifically, the DTMF signal B from the second telephone set 11 is temporarily muted by the muting circuit 25 as described later and thus, is inputted to the DTMF receiver 26 as the DTMF signal C2. On the other hand, the DTMF signal A from the first telephone set 6 is inputted to the DTMF receiver 26 as the DTMF signal C1 without any modification as described later.

The DTMF receiver 26 decodes the content of the DTMF signal as inputted, latches a result of such a decoding as data, and outputs the same to the data line 28. "D" indicates data outputted to the 4-bit data line 28. The DTMF receiver 26 outputs the communication request identification signal F on the basis of the presence or absence of the DTMF signal as inputted. The identification signal F assumes a shape of a signal equal to an envelop of the DTMF signal C. Then, a signal F1 and a signal F2 are outputted with a delay of a predetermining time period t1 being approximately 60 milliseconds after the DTMF signals C1 and C2 are inputted, respectively.

The switch control line 27 outputs a switch control signal E which enters the active state (high level) by a constant time period t3, for example, 10 milliseconds in this embodiment shown after a delay of a time period t2 on the basis of the identification signal. In a time period t3 during when the switch control signal E is at the high level, the movable contact 23a of the switch 23 in the muting circuit 25 is connected to the stationary contact 23c. Therefore, the DTMF signal B from the second telephone set 11 is muted by the muting circuit 25 and is inputted to the DTMF receiver 26 as the above described DTMF signal C2. On the other hand, the DTMF signal A from the first telephone set 6 is held by the resistor R and thus, is inputted to the DTMF receiver 26 as the above described DTMF signal C1.

Figure 5:
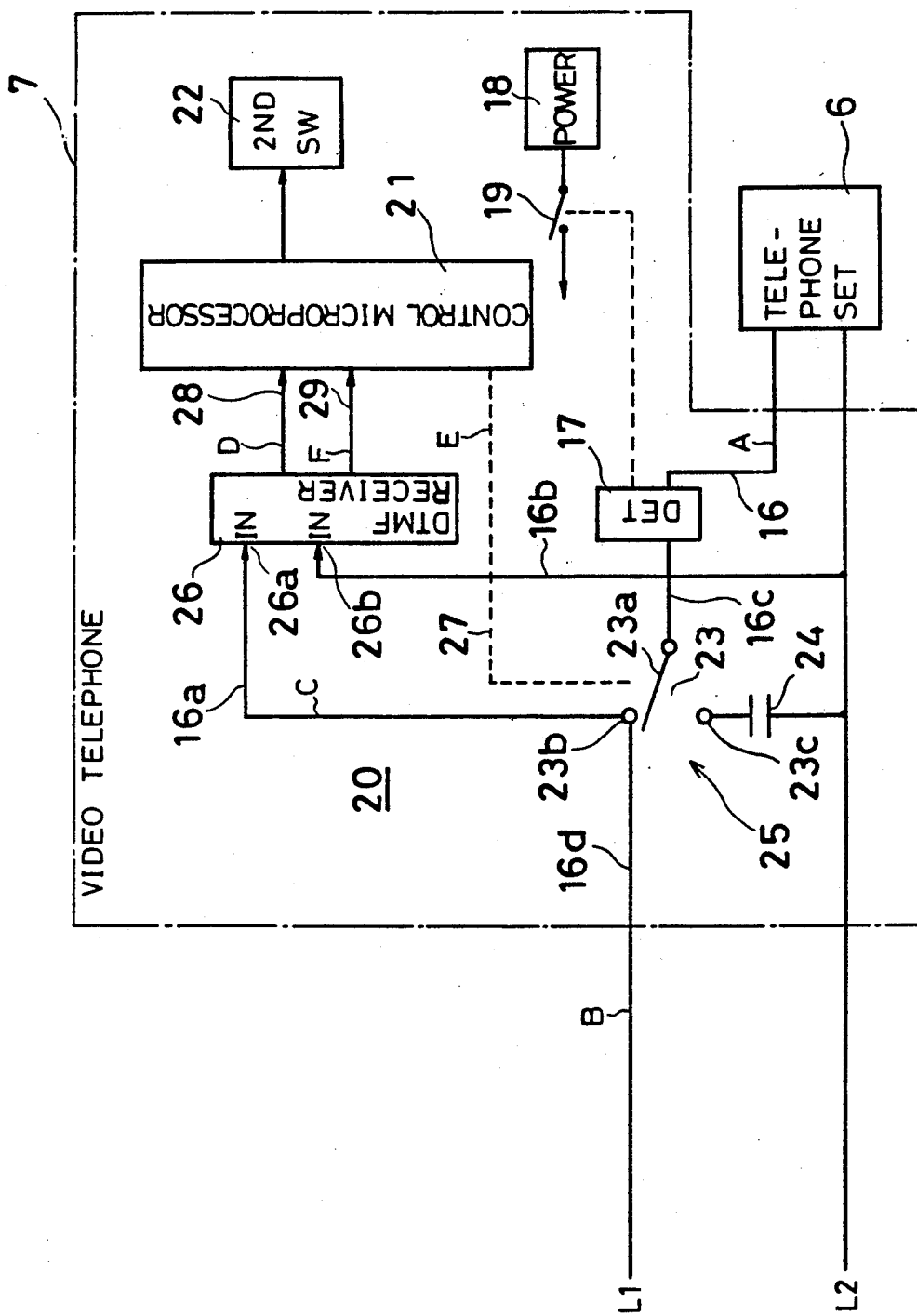
FIG. 5 is a block diagram showing a schematic configuration of a front end portion of a video telephone in accordance with another embodiment of the present invention.

The communication request identifying portion 20 may be constructed as shown in FIG. 5 apart from the above described configuration as shown in FIG. 2.

Figure 6:
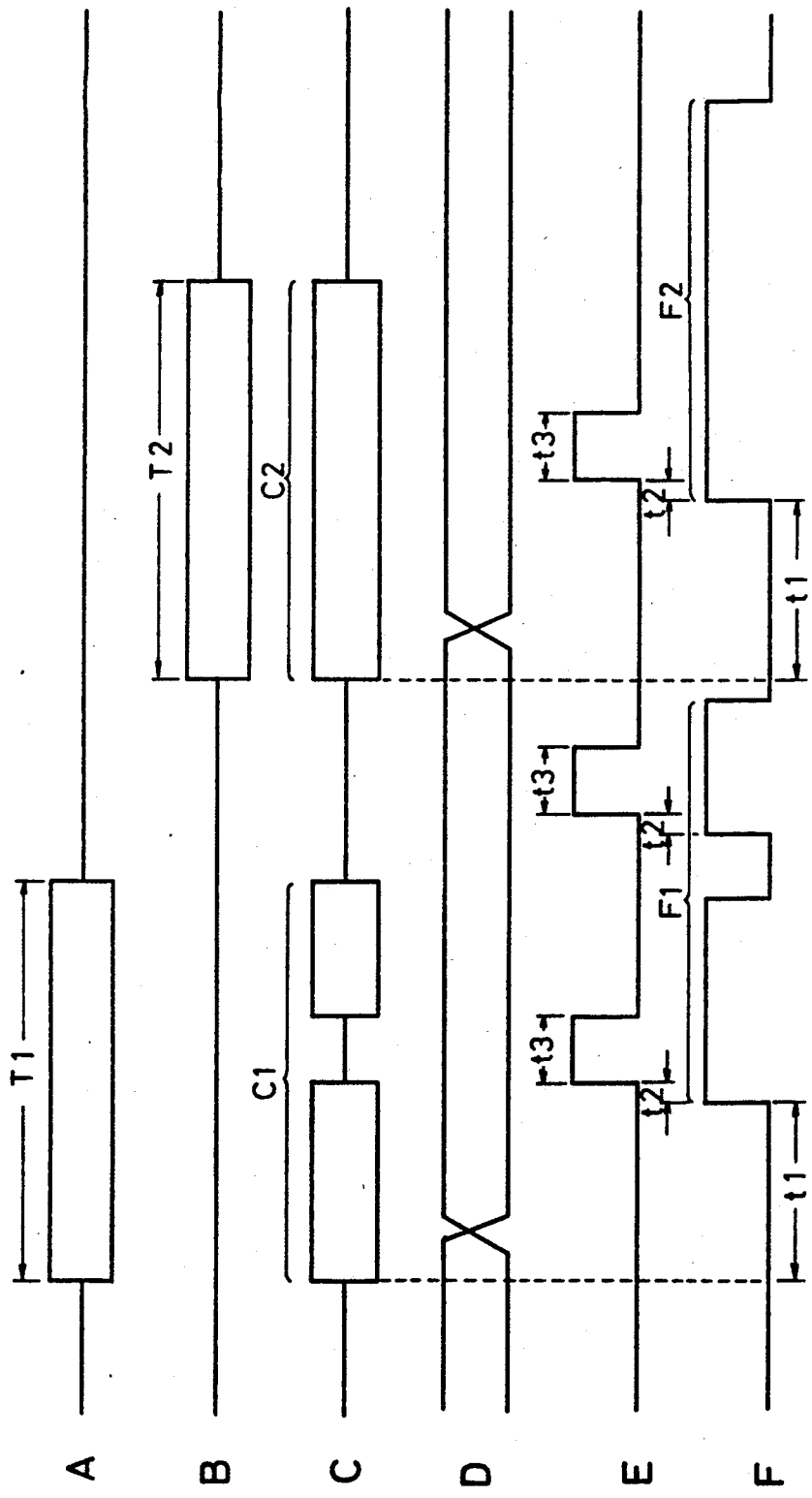
FIG. 6 is a timing chart showing an operation of identification of a request for communication.

In this embodiment shown in FIGS. 5 and 6, the communication request identifying portion 20 includes a muting circuit 25 having a switch 23 and a capacitor 24, and a DTMF receiver 26 receiving a DTMF signal between telephone lines 16a and 16b as its input. There is provided with a control portion 21 which receives an output of the DTMF receiver 26 as its input to control the above described switch 23. The switch 23 has a movable contact 23a connected to a telephone line 16c on the side of a first telephone set 6. The movable contact 23a is normally connected to a stationary contact 23b connected to a telephone line 16d on the side of the second telephone set 11; however, the movable contact 23a is connected to a stationary contact 23c connected to a common telephone line 16b through the capacitor 24 when the switch control signal on the switch control line 27 is in an active state.

The DTMF receiver 26 has its input terminals 26a and 26b respectively connected to the stationary contact 23b and the telephone line 16b. A DTMF signal from the first telephone set 6 is inputted through the muting circuit 25 to the DTMF receiver 26, but a DTMF signal from the second telephone set 11 is directly inputted thereto. The DTMF receiver 26 receives the DTMF signals to output data being dependent on the content of the DTMF signal to a 4-bit data line 28, and outputs a communication request identification signal F to a line 29. The switch control line 27 outputs a switch control signal E on the basis of the communication request identification signal to control the switch 23 in the muting circuit 25 so as to switch the movable contact 23a to the stationary contact 23c in a time period during when the switch control signal is active.

In FIG. 6 which is a timing chart for explaining an operation of the communication request identification portion, "A" indicates a DTMF signal outputted when the push-button of the first telephone set 6 is operated. The DTMF signal A is generally outputted over 60 milliseconds or more. A time period T1 indicates a time period during when the DTMF signal A is generated. "B" indicates a DTMF signal outputted when the push-button of the second telephone set 11 is operated. The DTMF signal B is also outputted over 60 milliseconds or more. A time period T2 indicates a time period during when the DTMF signal is generated.

A DTMF signal C is inputted to the input terminals 26a and 26b of the DTMF receiver 26, a DTMF signal C1 and a DTMF signal C2 being respectively inputted thereto during the time periods T1 and T2. More specifically, the DTMF signal A from the first telephone set 6 is temporarily muted by the muting circuit 25 and thus, is inputted to the DTMF receiver 26 as the DTMF signal C1; however, the DTMF signal D from the second telephone set 11 is inputted as it is to the DTMF receiver 26 as the DTMF signal C2.

The DTMF receiver 26 decodes the content of the DTMF signal as inputted, latches a result of such decoding as data, and output the data to the data line 28. "D" indicates data outputted to the 4-bit data line 28. The DTMF receiver 26 outputs the communication request identification signal F on the basis of the presence or absence of the DTMF signal as inputted. The identification signal F assumes a shape of a signal equal to an envelop of the DTMF signal C. Then, a signal F1 and a signal F2 in the time period T2 are respectively obtained with a delay of a predetermined time period t1 being approximately 60 milliseconds after the DTMF signals C1 and C2 are inputted, respectively.

The control portion 21 receives the communication request identification signal F as its input to output a switch control signal E which enters an active state (a high level) by a constant time period t3, for example, 10 milliseconds in this embodiment shown after a delay time t2 on the basis of the identification signal. In the time period t3 during when the switch control signal E is at the high level, the movable contact 23a of the switch 23 in the muting circuit 25 is switched to the side of the stationary contact 23c. Therefore, the DTMF signal A from the first telephone set 6 is muted by the muting circuit 25 and is inputted to the DTMF receiver 26 as the DTMF signal C1.

The above described constant time period t3 is set to such a degree that the intra-office switch (not shown) does not handle DTMF signals before and after a time period during when a DTMF signal is missing as different DTMF signals, that is, the intra-office switch can handle the DTMF signals as the same DTMF signal, for example, 30 milliseconds or less, and to such a degree that the time period during when the DTMF signal is missing can be identified on the identification signal F, for example, a few or several milliseconds or more. In addition, the intra-office switch is usually adapted to determine that a DTMF signal continues for 50 milliseconds or more so as to recognize the DTMF signal as a regular DTMF signal. Accordingly, the delay time t1 may be set to a suitable time period longer than this time period 50 milliseconds. However, the delay time t1 must be set to a time period sufficiently shorter than a time period during when the push-button is depressed, generally, at least 500 milliseconds.

The communication request identification signal F from the DTMF receiver 26 is respectively applied to the control portion 21 as the identification signal F1 and the identification signal F2 when the DTMF receiver 26 receives the DTMF signal A from the first telephone set 6 and when the same receives the DTMF signal B from the second telephone set 11.

The control portion 21 is so adapted as to receive the data supplied from the data line 28 and the above described communication request identification signal F supplied from the DTMF receiver 26 to control the second switch 22 for designating various operation modes of the video telephone 7. In addition, the control portion 21 performs controls, for example, storing a picture taken by a video camera (not shown) of the video telephone 7 in a memory and reads the picture from the memory to display the same on a display means (not shown).

Figure 4A:
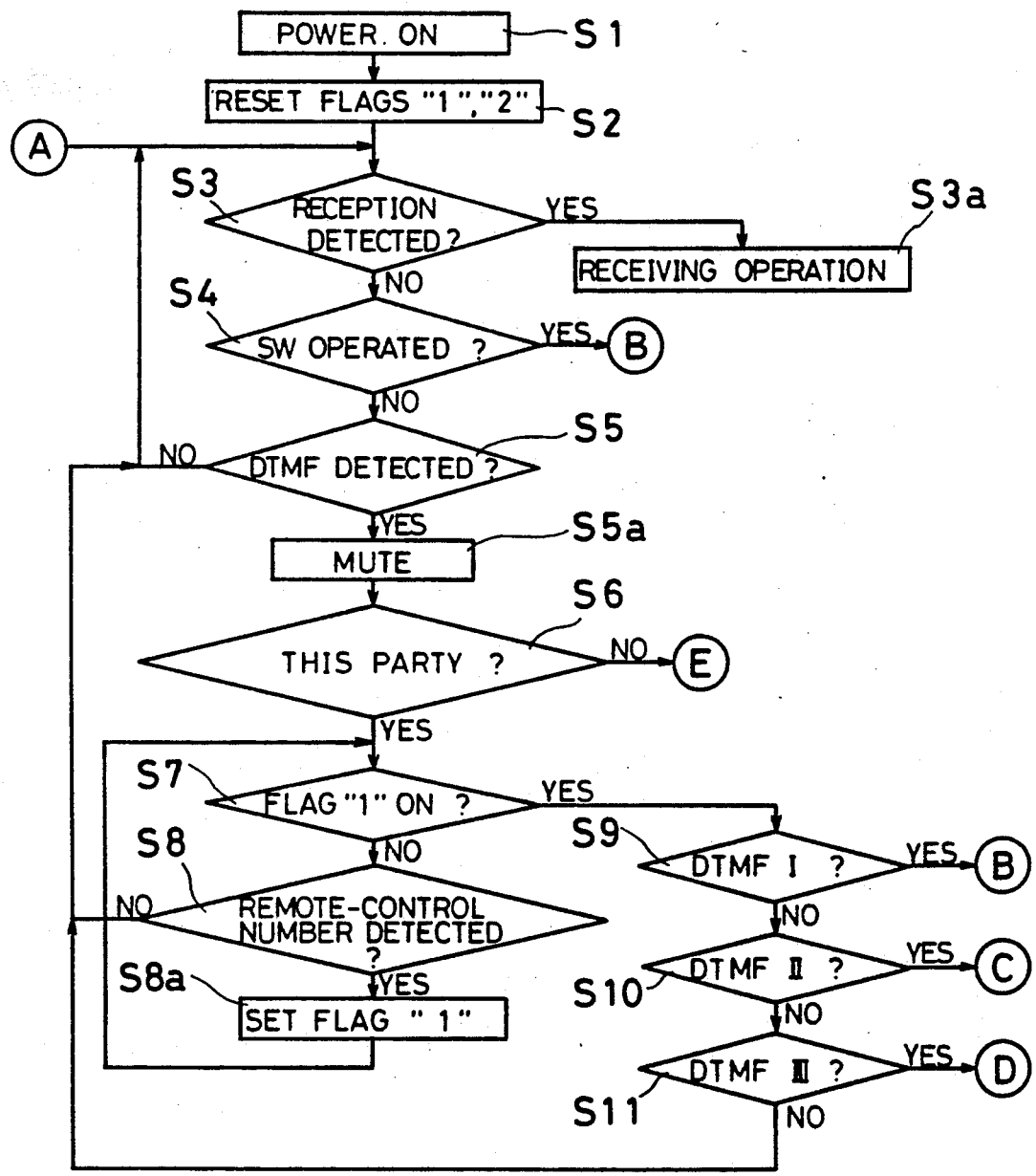

FIGS. 4A and 4B are flowcharts showing an operation of the video telephone. When a handset of the first telephone set 6 is removed from a hook button, the first switch 19 is responsively closed, so that the power supply 18 is connected to the driving portion (not shown) of the video telephone 7. Therefore, the video telephone 7 is set in a stand-by state in the step S1. Thereafter, in the step S2, both of flags "1" and "2" of the control portion 21 are reset. The flag "1" is set when an operation mode of the video telephone 7 is to be controlled by the first telephone set 6; however, the flag "2" is set when an operation mode thereof is to be controlled by the second telephone set 11.

The steps S3 and S4 are steps of executing an ordinary operation of the video telephone 7. In the step S3, a presence or absence of the reception from a telephone set at the other party, that is, in this case, the second telephone set 11 is detected. Then, in the step S4, the presence or absence of input from an operation switch (not shown) of the video telephone 7 at this party is detected. If the above described reception is detected, the video telephone 7 carries out a receiving operation in the step S3a or carries out various operations "displaying picture", "taking picture", "sending picture" and the like in response to the above described operation switch in the step S17.

When the video telephone 7 receives the DTMF signal A or B, the control portion 21 detects the same in the step S5 and then, switches the movable contact 23a of the switch 23 in the muting circuit 25 to the side of the stationary contact 23c by a constant time period t3 to mute an input of the DTMF signal B to the receiver 26 as shown in the step S5a. Then, the identifying portion 20 in the video telephone 7 identifies the type of the DTMF signal in the step S6. The process proceeds to the step S7 when the DTMF signal is from the first telephone set 6; however, the process proceeds to the step S12 when the DTMF signal is from the second telephone set 11. The DTMF signals A and B may utilize the remote-control number and the identification number as described later.

In the step S7, it is determined whether or not the flag "1" is set. When the remote-control number "* 1 2" are inputted from the first telephone set 6, the remote-control number is detected in the step S8 to set the flag "1" as in the step S8a. Accordingly, after the remote-control number is inputted, various operations as shown in the steps S17, S18 and S19 can be executed and processed in response to command by push-buttons from the first telephone set 6 in the steps S9, S10 and S11. Such an operation is possible irrespective of whether or not a telephone line is connected between the first telephone set 6 and the second telephone set 11.

In the step S12, it is determined whether or not the flag "2" is set. When the identification number "9 8 7" is inputted from the second telephone set 11, the identification number is detected in the step S13 to set the flag "2" as shown in the step S13a. Accordingly, after the identification number is inputted, various operations as shown in the previous steps S17, S18 and S19 can be executed and processed in response to a command by push-buttons from the second telephone set 11.

In addition, the DTMF signals I; II; and III as shown in the steps S9, S10 and S11 or S14, S15 and S16 are respectively utilized as signals for commanding operations such as "displaying picture", "taking picture" and "sending picture"; an operation for adjusting the brightness of the video camera; and an operation for adjusting an angle of the video camera.

The flags "1" and "2" are effective so long as the power supply 18 of the video telephone 7 is not disconnected by the switch 19. Once the flags "1" or "2" are set by the remote-control number or the identification number, the video telephone 7 can be then controlled by the first telephone set 6 or the second telephone set 11.

Description is now made on specific examples of a case where the video telephone 7 is controlled by the telephone set at this party, that is, first telephone set 6 and a case where the same is controlled by the telephone set at the other party, that is, the second telephone set 11, respectively. In such cases, the telephone number, the remote-control number and the identification number of each of the telephone sets are as shown in FIG. 1. In addition, as a remote operation function, push-buttons "9", "8" and "7" of each of the telephone sets 6 and 11 respectively corresponding to "sending picture", "taking picture" and "displaying picture" of the video telephone 7.

Control at this party

The handset of the first telephone set 6 is removed from the hook button so as to call the other party telephone set 11. Then, the power supply 18 of the video telephone 7 is turned on and the flags "1" and "2" are reset. The telephone number of the second telephone set 11 is then inputted so as to call the other party. In a case where a line to be used is an analog telephone line, even if the number of the other party is dialed no DTMF signal is outputted. Accordingly, the video telephone 7 only repeats the steps S3-S5 as shown in FIG. 4A.

On the other hand, in a case where the line to be used is a push-button line, when the number of the other party is being inputted, the DTMF signal A is detected in the step S5 and it is determined that a calling subscriber is on the side of the first telephone set 6. However, the flag "1" is in the reset state. In addition, the remote-control number is not detected. Consequently, the process is returned to the step S3 from the step S8. While the telephone number of the other party is being inputted, the steps S3-S8 are only repeated. A mode selecting operation of the video telephone 7 is not executed so long as the remote-control number is not inputted.

When the remote-control number "* 1 2" is inputted with the line being connected, this remote-control number is detected in the step S8 and the flag "1" is set. Accordingly, the process is branched from the step S7 to the step S9, thereby to allow the remote-control operation. In addition, the steps S3–S11 are repeated until the power supply 18 is turned off.

In a case where the picture is transmitted to the second video telephone 12 (FIG. 1) on the side of the second telephone set 11 from the first video telephone 7 on the side of the first telephone set 6, if the push-buttons "7", "8" and "9" are operated, the video telephone 7 at this party carries out operations of "displaying picture", "taking picture" and "sending picture", thereby to allow the picture to be transmitted to the other party.

In general, when a constant time period, for example, approximately 20 to 30 seconds elapsed since a handset of a telephone set was removed from a hook button, and when an operation for depressing a push-button is not carried out within a predetermined time period, for example, approximately 5 seconds after a DTMF signal is generated by depressing the previous push-button, a busy tone signal is transmitted to the second telephone set 11 from the switch 3. Thereafter, even if a DTMF signal is inputted from the telephone set 6 at this party, the switch 3 does not receive the DTMF signal. The handset must be removed from the hook button once so as to receive the DTMF signal.

However, in this embodiment shown, the operation mode of the video telephone 7 can be controlled by utilizing the handset of the telephone set 6 at this party without connecting a line to the other party by taking an advantage of the foregoing advantage. Therefore, the efficiency of the transmission process can be increased by previously storing the picture to be transmitted to the other party in the memory within the video telephone 7 and processing the same and then, transmitting the stored image to the other party.

Control the other party

First, a phone call is made from the second telephone set 11 to the first telephone set 6. When the first telephone set 6 has an automatic incoming function to make incoming response, the power supply 18 is turned on to the first video telephone 7. Therefore, the first video telephone 7 is set in an operable state. The video telephone 7 resets the flags "1" and "2" in the step S2 in FIG. 4, and the steps S3–S5 are repeated until the DTMF signal is detected.

In this state, when the identification number is inputted from the second telephone set 11, the DTMF signal is detected in the steps S5, and it is determined in the step S6 that the DTMF signal is from the second telephone set 11. Therefore, the process is branched to the step S12. The flag "2" is in the reset state until the identification number is decoded in the step S13. If the flag "2" is set, the process proceeds to the steps S14–S16 to receive a remote-control from the second telephone set 11. For example, when the push-buttons "7", "8" and "9" of the second telephone set 11 are depressed, a picture taken by the video camera of the first video telephone 7 can be displayed on the display means of the second video telephone 12.

When the identification number is not detected in the step S13, the process is returned to the step S3 so that a remote-control operation cannot be carried out. Therefore, a crank call or the like can be prevented. When the flag "2" is set once, a process for remote-control operation is executed until the telephone line is disconnected.

Although the video telephone has been described as an embodiment, the present invention can be also applied to an arbitrary communication device for establishing communication utilizing a telephone line.

In addition, although the push-button telephone set is used as a telephone set, the present invention can be also carried out by using a dial telephone set or the like. In this case, a dial signal is outputted as the number of intermissions of a direct current. Therefore, signal switching may be achieved using a DTMF signal or a control signal corresponding to the DTMF signal which are formed using the dial signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication device connected to a telephone line, comprising:
   switch means for selectively switching an operation mode;
   means for receiving a first request for communication from a first telephone set directly and a second request for communication from a second telephone set through the telephone line, the second telephone set being at an area remote from the first telephone set and the communication device;
   identifying means responsive to said receiving means for distinguishably identifying a result as between the first request for communication which is outputted from the first telephone set and the second request for communication which is outputted from the second telephone set; and
   control means for controlling said switch means to switch the operation mode in accordance with the result of the identification by said identifying means.

2. A communication device in accordance with claim 1, wherein said control means includes allowing means for allowing the first telephone set to control the switch means in response to the identification of a request for communication from the first telephone set.

3. A communication device in accordance with claim 2, further comprising a further switch which is so constructed as to be set in an active state in response to an operation for starting communication.

4. A communication device in accordance with claim 1, wherein said control means includes further allowing means for allowing the second telephone set to control the switch means in response to the identification of a request for communication from the second telephone set.

5. A communication device in accordance with claim 4, wherein said first telephone set is initiated in response to a calling operation of said second telephone set, and further comprising a further switch which is so constructed as to be set in an active state in response to an initiation of said first telephone set.

6. A communication device as in claim 1, in combination with said first telephone set being arranged integrally with the communication device.

7. A communication device as in claim 1, in combination with said first telephone set being arranged adjacent to the communication device.

* * * * *